United States Patent
Bouchet et al.

(10) Patent No.: US 12,227,234 B2
(45) Date of Patent: Feb. 18, 2025

(54) METHOD FOR CONTROLLING A POWER STEERING SYSTEM MAKING IT POSSIBLE TO LIMIT A PHYSICAL SUPPLY CURRENT SUPPLIED TO A POWER STEERING MOTOR IN THE EVENT OF A MECHANICAL IMPACT BETWEEN A RACK AND A MECHANICAL END STOP

(71) Applicant: JTEKT EUROPE, Irigny (FR)

(72) Inventors: Arnaud Bouchet, Oullins (FR);
Ghislain Poncet, Doizieux (FR)

(73) Assignee: JTEKT EUROPE, Irigny (FR)

( * ) Notice: Subject to any disclaimer, the term of this patent is extended or adjusted under 35 U.S.C. 154(b) by 233 days.

(21) Appl. No.: 17/797,571

(22) PCT Filed: Feb. 3, 2021

(86) PCT No.: PCT/FR2021/050191
§ 371 (c)(1),
(2) Date: Aug. 4, 2022

(87) PCT Pub. No.: WO2021/156566
PCT Pub. Date: Aug. 12, 2021

(65) Prior Publication Data
US 2023/0055032 A1     Feb. 23, 2023

(30) Foreign Application Priority Data

Feb. 4, 2020   (FR) ...................... 20/01095

(51) Int. Cl.
*B62D 5/04*   (2006.01)
*B62D 6/04*   (2006.01)

(52) U.S. Cl.
CPC ......... *B62D 5/0469* (2013.01); *B62D 5/0463* (2013.01)

(58) Field of Classification Search
CPC ...... B62D 5/04; B62D 5/0469; B62D 5/0463; B62D 6/04; B62D 1/00
See application file for complete search history.

(56) References Cited

U.S. PATENT DOCUMENTS

| 6,268,708 B1 | 7/2001 | Kawada et al. |
| 2008/0199160 A1 | 8/2008 | Yamazaki |

(Continued)

FOREIGN PATENT DOCUMENTS

JP     2012-240537 A     12/2012

OTHER PUBLICATIONS

Apr. 12, 2021 Written Opinion of the International Searching Authority issued in Patent Application No. PCT/FR2021/050191.

(Continued)

*Primary Examiner* — Tan Q Nguyen
(74) *Attorney, Agent, or Firm* — Oliff PLC

(57) ABSTRACT

A method for controlling a power steering system of a vehicle which is intended to limit the physical supply current supplied to the at least one power steering motor in the event of an impact between at least one rack and at least one mechanical end stop, the control method including: —a determination step wherein the power steering computer determines a setpoint torque for the power steering motor; —a driving step wherein the power steering computer determines the setpoint supply current for the power steering motor; wherein the control method also includes: —a detection step wherein the power steering computer detects an impact between rack and mechanical end stop; —a protection step emitting a protected signal to the driving step when an impact is detected, so that the setpoint supply current determined by the driving step is below a maximum setpoint supply current.

10 Claims, 5 Drawing Sheets

(56) References Cited

U.S. PATENT DOCUMENTS

| | | | |
|---|---|---|---|
| 2013/0118826 A1* | 5/2013 | Izutani | B62D 5/065 |
| | | | 180/421 |
| 2016/0096545 A1* | 4/2016 | Nakakuki | B62D 5/0469 |
| | | | 701/41 |
| 2016/0221601 A1* | 8/2016 | Barthomeuf | B62D 5/0469 |
| 2018/0057047 A1 | 3/2018 | Toko et al. | |

OTHER PUBLICATIONS

Apr. 12, 2021 International Search Report issued in Patent Application No. PCT/FR2021/050191.

* cited by examiner

[Fig. 1]
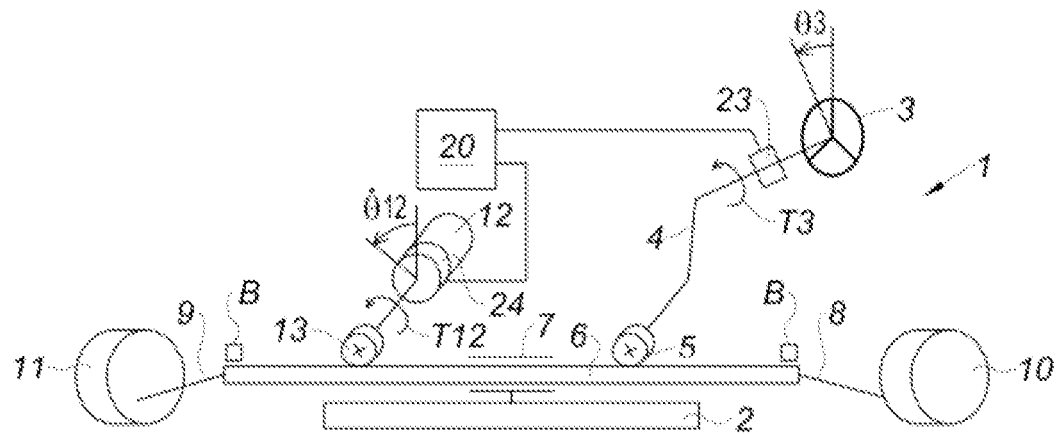
[Fig. 2]
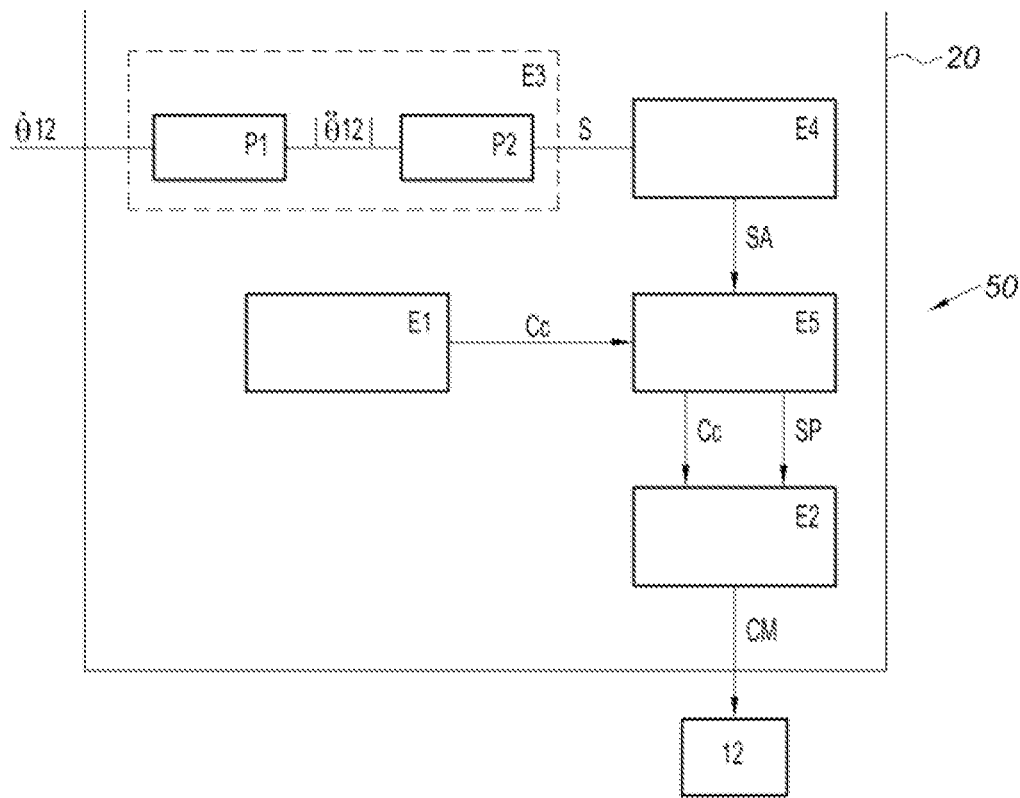

[Fig. 3]
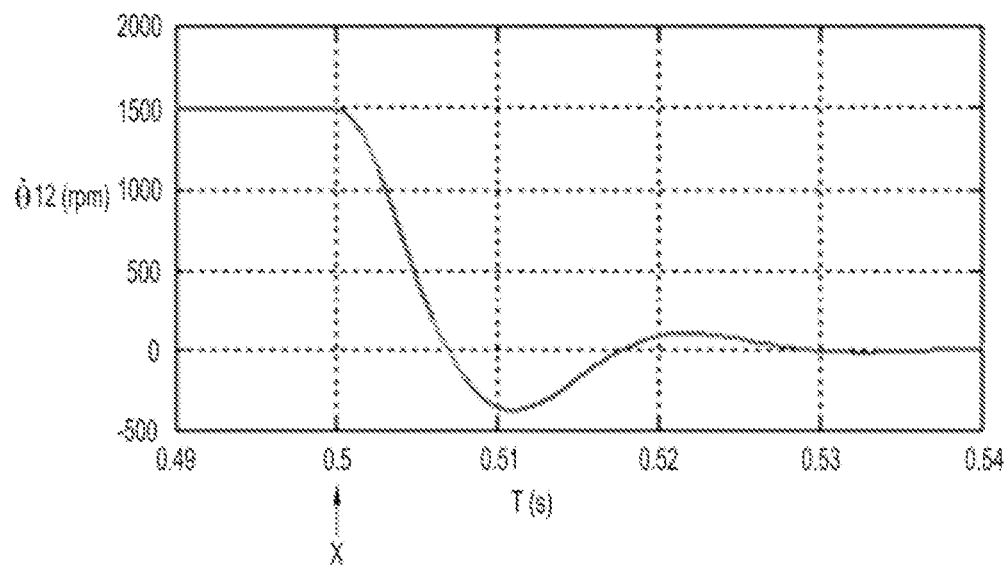
[Fig. 4]
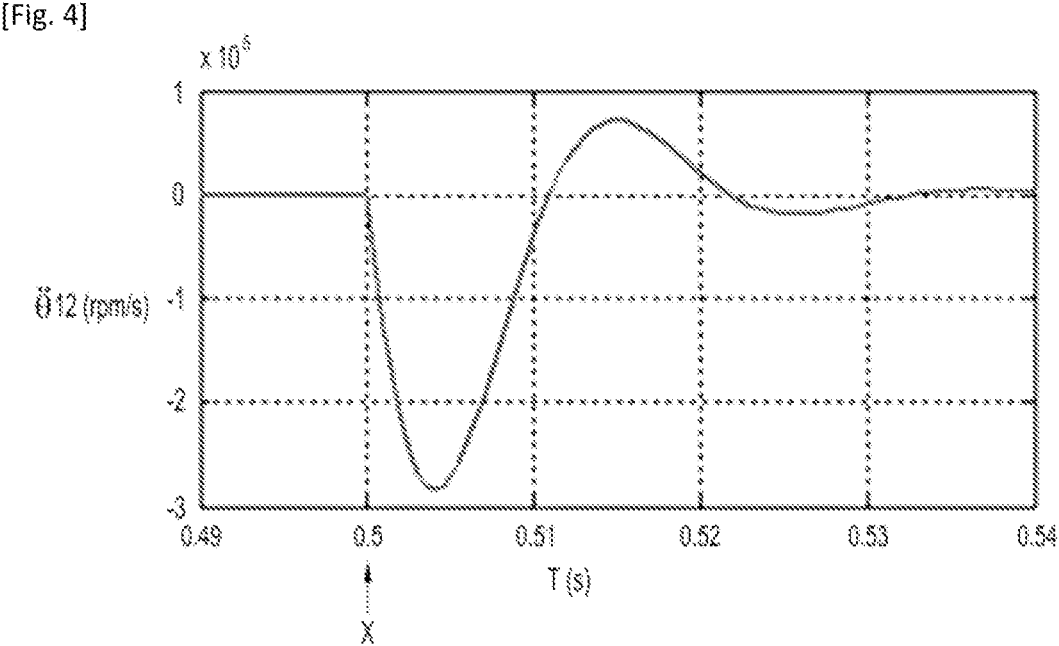

[Fig. 5]
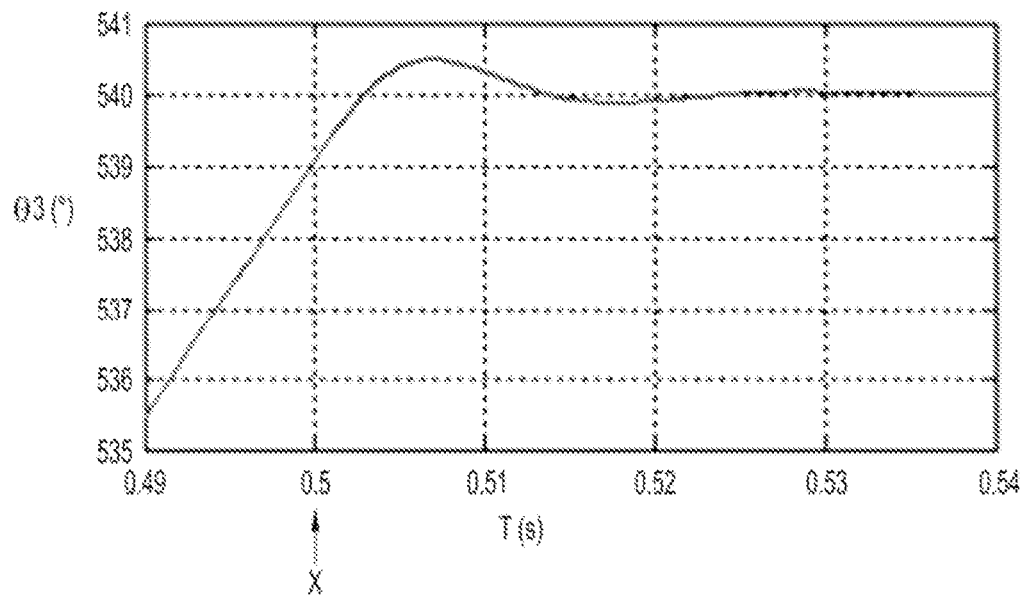
[Fig. 6]
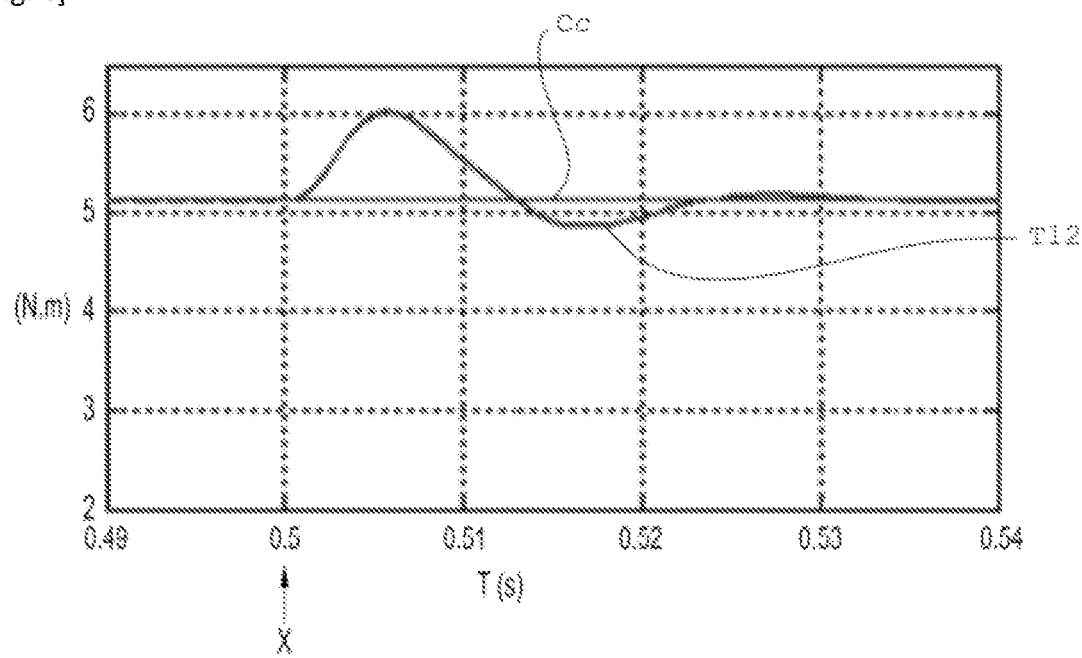

[Fig. 7]
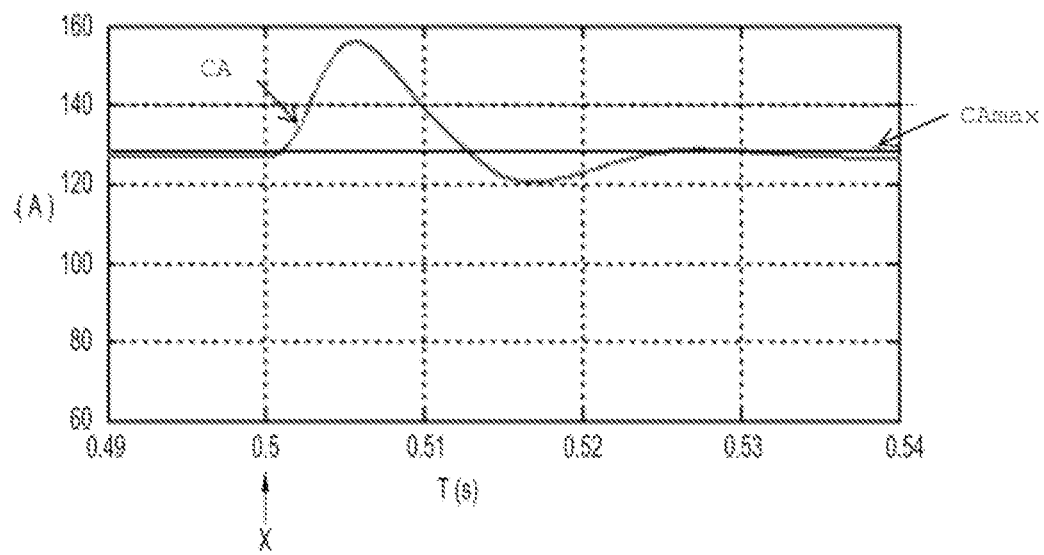
[Fig. 8]
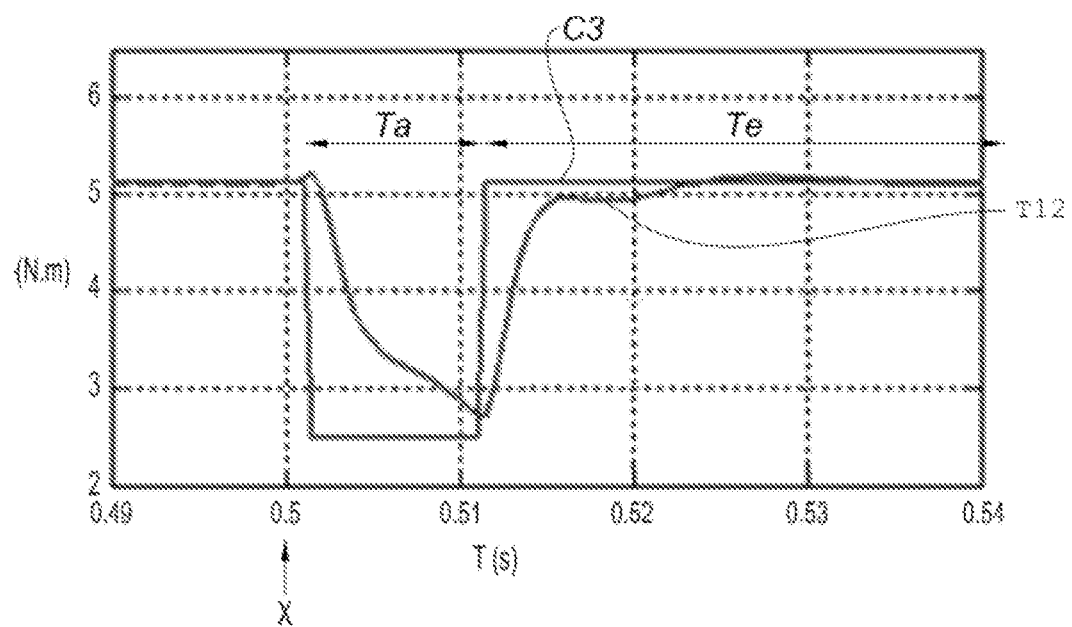

[Fig. 9]
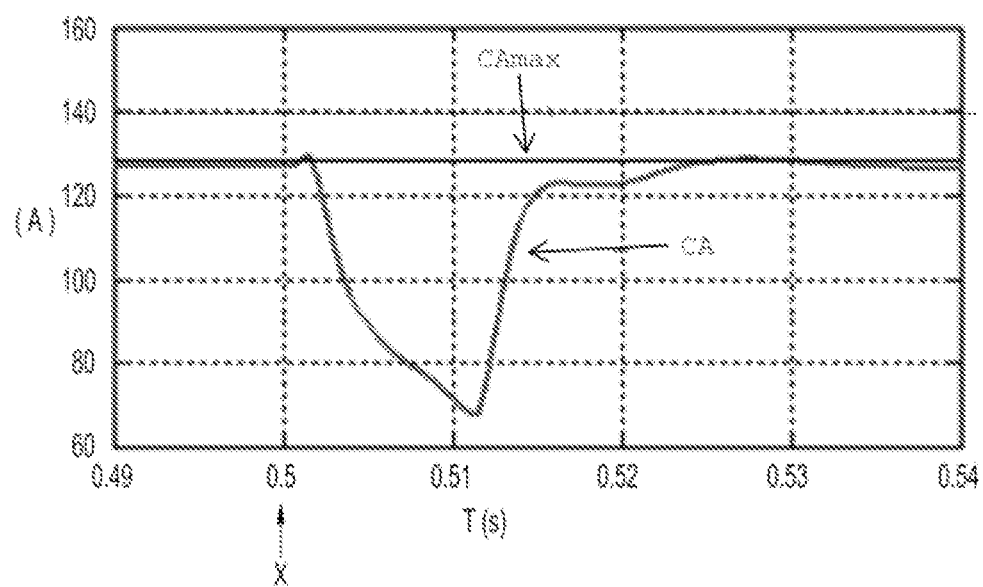

METHOD FOR CONTROLLING A POWER STEERING SYSTEM MAKING IT POSSIBLE TO LIMIT A PHYSICAL SUPPLY CURRENT SUPPLIED TO A POWER STEERING MOTOR IN THE EVENT OF A MECHANICAL IMPACT BETWEEN A RACK AND A MECHANICAL END STOP

The invention relates to the field of power steering systems for a vehicle and more particularly to a control method limiting a physical supply current of an assist motor upon an impact between a rack and a mechanical stop.

The purpose of a steering system of a vehicle is to enable a driver to control a trajectory of the vehicle by exerting a force on a steering wheel.

In general, a steering system comprises several elements including said steering wheel connected to a steering column, a rack, and two wheels each connected to a tie rod. The rack is the part allowing connecting the steering wheel, via the steering column, to the wheels, via the tie rods; that is to say the rack transforms the forces exerted by the driver on the steering wheel into a rotation of the wheels of the vehicle.

The rack is movable in translation between two mechanical stops determining a first extreme position and a second extreme position of the rack.

An electric power steering system of a vehicle uses an assist motor, driven by a steering computer, to reduce the effort to be applied by the driver on the steering wheel to turn the wheels of the vehicle. In particular, based on the forces exerted on the steering wheel, that is to say the steering wheel torque, the steering computer determines an assist torque, hereinafter called setpoint torque. Afterwards, the steering computer determines a setpoint supply current of the assist motor on the basis of the setpoint torque. From the setpoint supply current and the constraints exerted on the assist motor, the latter consumes a physical supply current. In other words, the physical supply current is the actual current flowing through the assist motor. The physical supply current is not controllable because the constraints are not controllable. Only the setpoint supply current, which is a digital signal, is controllable.

Finally, the assist motor exerts an assist force, that is to say a motor torque, on the rack. The rack then performs a translational movement so as to turn the wheels.

In the case of proper operation, the motor torque is substantially equal to the setpoint torque, and the physical supply current is substantially equal to the setpoint supply current.

In the rest of the description, the term "torque" refers to a digital or analog signal representing a torque except in the case of the motor torque which indeed corresponds to a physical torque.

When the rack is close to a mechanical stop, an additional steering wheel torque from the driver brings the rack into contact with said mechanical stop. When said additional steering wheel torque is high, the setpoint torque is also high, increasing or maintaining an approach speed of the rack until a mechanical impact with stop occurs. The mechanical impact exposes the power steering system to an overcurrent phenomenon, that is to say a rapid increase in the physical supply current of the assist motor beyond a maximum physical supply current, degrading the steering computer and/or disturbing the monitoring of the correct operation of the latter.

More specifically, the overcurrent phenomenon results firstly from the consequences of a large variation in the rack speed and secondly from the consequences of an increase in the steering wheel torque.

Upon a strong variation in the rack speed, corresponding to a deceleration of the rack speed upon the impact, the consequences are a sudden drop in the counter-electromotive force at the terminal of the assist motor, which is perceived as an uncompensated voltage disturbance which ultimately increases the physical supply current.

There is a known a solution allowing countering the consequences of a strong variation in the rack speed by modifying control parameters of the steering computer so as to anticipate and reject these voltage disturbances. The parameters allowing controlling performance, stability and robustness of the steering computer are called steering computer control parameters.

In the case of a closed-loop servo-control, the set control parameters can be gains such as, for example, proportional, integral or derivative gains.

However, this solution generates undesired side effects such as a decrease in the robustness and stability margins of the steering system.

The consequences of the increase in the steering wheel torque are linked to the mechanical impact. Indeed, the rack being connected to the steering wheel by the steering column, a sudden stop of the rack causes a significant steering wheel torque, therefore an increase in the setpoint torque, which induces an increase in the setpoint supply current and finally an increase in the physical supply current of the assist motor.

There are solutions allowing reducing the mechanical impact between the rack and a mechanical stop by decreasing the setpoint torque when approaching said mechanical stop. This solution, although effective, requires knowing an angle of the steering wheel, which is not the case in all steering systems.

The object of the invention is to remedy all or part of the aforementioned drawbacks, and in particular in the absence of the angle of the steering wheel, by proposing a method for controlling a power steering system of a vehicle comprising at least one steering computer, at least one steering wheel, at least one assist motor consuming a physical supply current and exerting a motor torque on at least one rack, a movement of the at least one rack being limited by at least one mechanical stop, said method being intended to limit the physical supply current of the at least one assist motor upon an impact between the at least one rack and the at least one mechanical stop, said control method comprising:
   a determination step in which the at least one steering computer determines a setpoint torque of the at least one assist motor;
   a drive step in which the at least one steering computer determines the setpoint supply current of the at least one assist motor;
   characterized in that the control method also comprises:
   a detection step in which the at least one steering computer detects an impact between the at least one rack and the at least one mechanical stop;
   a protection step emitting a protected signal to the drive step when an impact is detected, so that the setpoint supply current determined by the drive step is less than a maximum setpoint supply current.

The detection step allows detecting an impact situation in which the rack undergoes a significant deceleration, that is to say greater than a determined threshold. For this purpose, the detection step performs a comparison of a parameter representative of the acceleration of the rack with a predetermined threshold of said parameter.

The predetermined threshold depends on the parameter but also on a technology of the stop, such as for example its material, and on the reduction gains or gear ratios of the power steering system. The predetermined threshold is selected so as to be much higher than any other operating situation of the rack such as for example a maneuver controlled by the driver or during a disturbance originating from a road on which the vehicle is traveling.

There are several ways to ensure that the physical supply current will not exceed a maximum physical supply current. The method according to the invention allows so by limiting the setpoint supply current to a maximum setpoint supply current.

The protection step emits a protected signal when an impact is detected. In other words, the setpoint torque is replaced and/or supplemented by the protected signal so that the setpoint supply current of the assist motor determined by the drive step is less than a maximum setpoint supply current.

Thus, the consequences of a large variation in the rack speed leading to a sudden drop in the counter-electromotive force and the consequences of the increase in the steering wheel torque are indirectly compensated by a reduction in the setpoint supply current, which allows a decrease in the physical power current flowing through the assist motor. The overcurrent phenomenon is therefore avoided.

According to one feature of the invention, the protected signal corresponds to a limited setpoint torque.

There are several ways to ensure that the setpoint supply current will not exceed the maximum setpoint supply current. One of the solutions is to replace, when an impact is detected, the setpoint torque transmitted to the drive step with a limited setpoint torque. The limited setpoint torque is a predetermined value of the setpoint torque.

Thus, the limited setpoint torque allows deceiving the steering computer during the drive step in order to accelerate reaching a normal setpoint supply current without exceeding the maximum setpoint supply current.

According to one feature of the invention, the protected signal corresponds to at least one control parameter of the drive step.

When an impact is detected, the protection step transmits to the drive step a control parameter thereof.

Thus, for a limited duration and in the particular situation of an impact, the consequences of a large variation in the rack speed are attenuated by modifying at least one control parameter of the steering computer. In this way, it is possible to accelerate reaching a normal physical supply current without exceeding the maximum physical supply current.

As the modification of the control parameter is performed in a very limited manner in time, there is no edge effect perceptible to the driver of the vehicle.

According to one feature of the invention, the detection step emits an impact signal when an impact is detected.

Thus, the impact signal informs on an impact situation of the rack on the mechanical stop.

The impact signal can be emitted when an impact is detected or, conversely, be cut off when an impact is detected.

According to one feature of the invention, the protected signal depends on the impact signal.

Thus, the protected signal limiting the setpoint supply current of the assist motor is emitted only when an impact is detected.

According to one feature of the invention, the control method comprises a timing step receiving the impact signal and emitting an application signal to the protection step.

The timing step determines how the emission of the protected signal should be performed when an impact is detected.

Indeed, if the protected signal is emitted erratically, following a failure for example, this might degrade the safety of the method.

According to one feature of the invention, the protection step emits the protected signal when the application signal is present.

According to one feature of the invention, the timing step comprises an application time corresponding to a period during which the protected signal is emitted after the detection of an impact.

The application time is a duration during which the protected signal is emitted after the impact signal has been detected.

Thus, the application time ensures that when an impact is detected, the protected signal will be emitted long enough to avoid the overcurrent phenomenon, yet without exceeding a certain duration which could jeopardize the safety of the method.

According to one feature of the invention, the timing step comprises an exclusion time corresponding to a period during which the protected signal cannot be emitted after the detection of an impact.

The exclusion time is a duration during which the protected signal cannot be emitted. The exclusion time follows the application time.

Thus, the exclusion time limits the number of times the protected signal will be emitted during a period of time. In this way, the safety of the method is preserved.

According to one feature of the invention, the detection step detects an impact by means of an acceleration of the assist motor.

The acceleration of the assist motor is obtained by differentiation of the speed of the assist motor which is an easily measurable data. The acceleration has faster dynamics than speed. Thus, it is practical to detect an impact by means of an acceleration threshold.

The invention also relates to a power steering system of a vehicle allowing implementing a control method according to the invention.

The invention will be better understood, thanks to the description below, which relates to one embodiment according to the present invention, given as non-limiting example and explained with reference to the appended schematic drawings, in which:

FIG. 1 is a schematic representation of a power steering system;

FIG. 2 is a schematic representation of a method according to the invention;

FIG. 3 is a graph representing a speed of a steering motor upon impact;

FIG. 4 is a graph representing an acceleration of the steering motor upon impact;

FIG. 5 is a graph representing an angle of a steering wheel upon impact;

FIG. 6 is a graph representing a setpoint torque and a motor torque of the steering motor upon impact in the absence of the method according to the invention;

FIG. 7 is a graph representing a physical supply current of the steering motor upon impact in the absence of the method according to the invention and a maximum physical supply current;

FIG. 8 is a graph representing the setpoint torque and the motor torque of the steering motor upon impact in the presence of the method according to the invention;

FIG. 9 is a graph representing the physical supply current of the steering motor upon impact in the presence of the method according to the invention and the maximum physical supply current.

The invention relates to a method for managing a power steering system 1 for a vehicle 2, and more particularly for a motor vehicle 2 intended for the transport of persons.

In a manner known per se, and as shown in FIG. 1, said power steering system 1 comprises a steering wheel 3 which enables a driver to maneuver said power steering system 1 by exerting a force, called "steering wheel torque" T3, on said steering wheel 3. The steering wheel torque T3 is measured by means of a torque sensor 23.

Said steering wheel 3 is preferably mounted on a steering column 4, guided in rotation on the vehicle 2, and which meshes, by means of a steering pinion 5, on a rack 6, which is itself guided in translation in a steering casing 7 fastened to said vehicle 2.

Preferably, each of the ends of said rack 6 is connected to a tie rod 8, 9 connected to the steering knuckle of a steered wheel 10, 11, such that the translational longitudinal displacement of the rack 6 allows modifying the steering angle of the steered wheels. An amplitude of the displacement of the rack 6 is limited by two mechanical stops B respectively positioned at a right end and a left end of the steering casing 7.

Moreover, the steered wheels 10,11 could preferably also be drive wheels.

The power steering system 1 also comprises an assist motor 12 intended to provide a motor torque T12, to assist the maneuver of said power steering system 1.

The assist motor 12 will preferably be an electric motor, with two directions of operation, and preferably a rotary electric motor, of the brush or brushless type.

The assist motor 12 can come into engagement, where necessary via a reducer of the gear reducer type, either on the steering column 4 itself, to form a so-called "single pinion" mechanism, or directly on the steering rack 6, for example by means of a second pinion 13 distinct from the steering pinion 5 which enables the steering column 4 to mesh with the rack 6, so as to form a so-called "double pinion" mechanism, as illustrated in FIG. 1, or else by means of a ball screw which cooperates with a corresponding thread of said rack 6, at a distance from said steering pinion 5.

The power steering system 1 also comprises a steering computer 20 which receives the steering wheel torque T3 from the torque sensor 23 and which determines a setpoint supply current CM of the assist motor 12.

In addition, a rotational speed $\dot{\theta}12$ of the assist motor 12 is determined by a motor speed 24 or position sensor.

A control method 50 according to the invention, implemented by the steering computer 20, is described more specifically in FIG. 2.

The control method 50 comprises a determination step E1 in which the steering computer 20 determines a setpoint torque Cc. The setpoint torque Cc corresponds to an assist torque, and therefore to the motor torque T12, which normally has to be applied by the assist motor 12.

The control method 50 comprises a drive step E2 in which the steering computer 20 determines the setpoint supply current CM of the assist motor 12.

From the setpoint supply current CM and the constraints exerted on the assist motor 12, the latter consumes a physical supply current CA. When the physical supply current CA of the assist motor 12 is greater than a maximum physical supply current $CA_{max}$, the steering computer 20 is degraded and/or disturbed.

The control method 50 comprises a detection step E3 in which the steering computer 20 detects an impact X between the rack 6 and a mechanical stop B. For this purpose, the detection step E3 comprises a phase P1 of computing the absolute value of the acceleration $|\ddot{\theta}12|$ of the assist motor 12 from the differentiation of the rotational speed $\dot{\theta}12$ of the assist motor 12. Then the detection step E3 comprises a tracking phase P2 in which the absolute value of the acceleration $|\ddot{\theta}12|$ of the assist motor 12 is compared with a predefined threshold. When the absolute value of the acceleration $|\ddot{\theta}12|$ of the assist motor 12 exceeds the predefined threshold, the method 50 according to the invention considers that an impact X has taken place between the rack 6 and a mechanical stop B. The detection step E3 then emits an impact signal S.

The control method 50 also comprises a timing step E4 which emits an application signal SA from the impact signal S so as to guarantee the safety of the control method 50. More specifically, the timing step E4 emits the application signal SA for an application time Ta when an impact X is detected by the detection step E3, in other words when the impact signal S is emitted. The application time Ta is less than 50 ms and preferably less than 10 ms. In addition, the timing step E4 prevents an emission of the application signal SA during an exclusion time Te after the end of the application time Ta. The exclusion time is less than 10 s and preferably less than 5 s.

The control method 50 comprises a protection step E5 which receives the setpoint torque Cc and the application signal SA and which emits a protected signal SP and the setpoint torque Cc to the drive step E2 when the application signal SA is emitted. When the application signal SA is absent, the protection step E5 does not interfere with the determination step E1 and only transmits the setpoint torque Cc.

The protected signal SP comprises a setpoint torque C3 limited to a predetermined value and a control parameter of the drive step E2.

The FIGS. 3 to 9 illustrate some parameters of the steering system 1 upon an impact X occurring at 0.5 s.

FIG. 3 represents the rotational speed $\dot{\theta}12$ of the assist motor 12 as a function of time T. Upon the impact X, the rotational speed $\dot{\theta}12$ decreases significantly. Indeed, the rack 6 is stopped in its movement by the stop B. Then the rotational speed $\dot{\theta}12$ has a bounce before stabilizing at approximately 0.52 s. The bounce is linked to a nature of the mechanical stop, that is to say its elasticity.

FIG. 4 represents the acceleration $\ddot{\theta}12$ of the assist motor 12 as a function of time T. This is the derivative of the rotational speed $\dot{\theta}12$. Thus, the acceleration $\ddot{\theta}12$ decreases significantly to a minimum before rising again, bouncing and stabilizing at around 0.52 s.

FIG. 5 represents a steering wheel angle θ3 of the steering wheel 3 as a function of the time T. Before the impact X, the driver turns the steering wheel 3, the steering wheel angle θ3 increases. Upon the impact, the elasticity of the stop B enables the driver to turn the steering wheel further, the steering wheel angle θ3 increases a little further up to a maximum elasticity value before stabilizing at a maximum rotation value of 540°.

FIG. 6 illustrates the motor torque T12 and the setpoint torque Cc as a function of time T when the control method 50 according to the invention is not present in the steering computer 20. In FIG. 6, the assist motor 12 should achieve a motor torque T12 equal to 5.2 N·m corresponding to the setpoint torque Cc. However, the motor torque T12 supplied by the assist motor 12 has an increase then a decrease before stabilizing at the setpoint torque Cc. This phenomenon is linked to the impact X.

FIG. 7 illustrates the physical supply current CA of the assist motor 12 as a function of time T when the control method 50 according to the invention is not present in the steering computer 20. The physical supply current CA has a curve substantially similar to that of the motor torque T12 illustrated in FIG. 6. In other words, after the impact X, the physical supply current CA increases sharply, exceeding the maximum physical supply current $CA_{max}$ and then decreases before stabilizing. When increasing, the physical supply current CA passes through a maximum exceeding the maximum physical supply current $CA_{max}$, which corresponds to an overcurrent phenomenon in the power steering system 1.

FIG. 8 illustrates the motor torque T12 as a function of time T when the control method 50 according to the invention is present in the steering computer 20. In this case, the assist motor 12 should perform a motor torque T12 having a profile as requested by the limited setpoint torque C3 emitted by the protection step E5. In this way, the motor torque T12 provided by the assist motor 12 has a very slight increase then a decrease before increasing again to stabilize at the limited setpoint torque C3. FIG. 8 also illustrates the application time Ta of the protected signal SP followed by the exclusion time Te during which the protected signal SP cannot be emitted.

FIG. 9 illustrates the physical supply current CA of the assist motor 12 as a function of time T when the control method 50 according to the invention is present in the steering computer 20. The physical supply current CA has a curve substantially similar to that of the motor torque T12. In other words, after the impact X, the physical supply current CA has a very slight increase but decreases rapidly thanks to an almost simultaneous reduction in the setpoint supply current CM. In this way, the overrun of the maximum physical supply current $CA_{max}$ is almost non-existent and the overcurrent phenomenon does not appear.

The control method 50 according to the invention thus allows avoiding the apparition of an overcurrent phenomenon without requiring knowledge of the steering wheel angle θ3 of the steering wheel 3.

Of course, the invention is not limited to the embodiments described and shown in the appended figures. Modifications remain possible, in particular with regards to the constitution of the various elements or by substitution with technical equivalents, yet without departing from the scope of protection of the invention.

The invention claimed is:

1. A method for controlling a power steering system of a vehicle comprising at least one steering computer, at least one steering wheel, at least one assist motor consuming a physical supply current and exerting a motor torque on at least one rack, a movement of the at least one rack being limited by at least one mechanical stop, the control method comprising:
   a determination step in which the at least one steering computer determines a setpoint torque of the at least one assist motor;
   a drive step in which the at least one steering computer determines a setpoint supply current of the at least one assist motor;
   a detection step in which the at least one steering computer detects an impact between the at least one rack and the at least one mechanical stop; and
   a protection step emitting a protected signal to the drive step when an impact between the rack and the mechanical stop is detected, so that the setpoint supply current determined by the drive step is less than a maximum setpoint supply current and the physical supply current of the at least one assist motor is limited upon the impact.

2. The control method according to claim 1, wherein the protected signal corresponds to a limited setpoint torque.

3. The control method according to claim 1, wherein the protected signal corresponds to at least one control parameter of the drive step.

4. The control method according to claim 1, wherein the detection step emits an impact signal when an impact is detected.

5. The control method according to claim 4, wherein the protected signal depends on the impact signal.

6. The control method according to claim 4, comprising a timing step receiving the impact signal and emitting an application signal to the protection step.

7. The control method according to claim 6, wherein the timing step comprises an application time corresponding to a period during which the protected signal is emitted after the detection of an impact.

8. The control method according to claim 6, wherein the timing step comprises an exclusion time corresponding to a period during which the protected signal cannot be emitted after the detection of an impact.

9. The control method according to claim 1, wherein the detection step detects an impact by means of an acceleration of the assist motor.

10. A power steering system of a vehicle allowing implementing a control method according to claim 1.

* * * * *